Patented Oct. 12, 1948

2,451,436

UNITED STATES PATENT OFFICE 2,451,436

METHOD OF PREPARING N-ALKYL ACRYLAMIDES

John G. Erickson, Greenwich, Conn., assignor to American Cyanamid Company, New York, N. Y., a corporation of Maine No Drawing. Application January 3, 1947, Serial No. 720,103

5 Claims. (Cl. 260—561)

The present invention relates to the preparation of α,β-unsaturated amides, and more particularly to a method of preparing N-alkyl acrylamides.

It is known that primary and secondary alkyl amines react with α,β-unsaturated esters, e. g., an acrylate ester, both by addition to the double bond and by reaction with the ester group to form aminoamides. These reactions may be illustrated by the following equations in which R represents an alkyl radical, X is a member of the group consisting of hydrogen and an alkyl radical and Y stands for a hydrocarbon radical

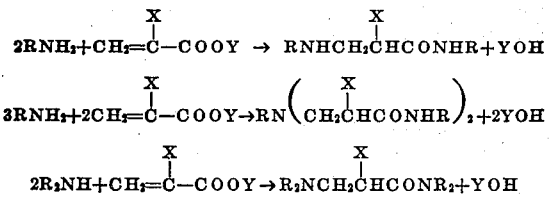

It has now been discovered that an N-alkyl α,β-unsaturated amide may be readily produced by heating an N-alkyl-β-alkylaminopropionamide as shown above in the presence of an acidic material having a dissociation constant greater than $1.0 \times 10^{-2}$ and which forms a stable amine salt with a primary or secondary alkyl amine at elevated temperatures, e. g., the temperature at which the aminoamide and the acidic material are heated which is usually within the range of from about 100°–250° C.

Suitable acidic materials for the reaction include sulfuric acid, hydrochloric acid, hydrobromic acid, phosphoric acid, sulfonic acids, alkyl sulfuric acids, ammonium acid sulfate and the like.

A typical example of the invention in which N-ethyl-β-ethylaminopropionamide is heated with hydrochloric acid to produce N-ethyl acrylamide may be illustrated by the following equation

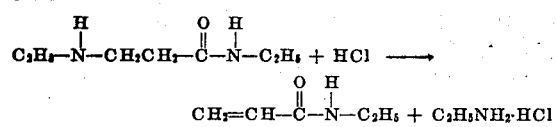

A preferred method of the invention consists in adding the acidic material to the aminoamide in a quantity sufficient to form the salt of the aminoamide, and thereafter heating the mixture to a temperature at which the salt splits into the alkyl amine salt and the N-alkyl α,β-unsaturated amide, the latter distilling off during the heating period. The alkyl amine salt remaining in the residue may be neutralized and the free amine recovered and utilized in a subsequent run.

The following examples in which the parts are by weight further illustrate the invention.

Example 1

65 parts of n-butylamine were gradually added to 40 parts of ethyl acrylate during a period of about 15 minutes. The mixture was heated under reflux for 65 hours, the temperature being maintained within the range of 95°–110° C. The resulting mixture was heated under vacuum to remove unreacted amine and alcohol. 20 parts of sulfuric acid (sp. gr. 1.84) were added, the product being stirred and cooled as the acid was added. The salt mixture was then stirred and heated under about 2 mm. pressure. 47.6 parts of crude distillate were obtained which after redistillation gave a 74.6% yield of N-n-butyl acrylamide boiling at 83°–85° C./1 mm.

Example 2

60 parts of n-butylamine were gradually added to 40 parts of ethyl acrylate during a period of about 15 minutes. The mixture was heated under reflux for 20 hours, the temperature being maintained within the range of 105°–110° C. The resulting mixture was heated under vacuum to remove unreacted amine and alcohol. 39.3 parts of hydrochloric acid (sp. gr. 1.19) were added, the product being stirred and cooled as the acid was added. The salt mixture was then stirred and heated under 20–25 mm. pressure. 39.1 parts of crude distillate were obtained which after redistillation gave a 60.8% yield of N-n-butyl acrylamide.

Example 3

A mixture consisting of 30 parts of n-butylamine and 20 parts of ethyl acrylate was heated under reflux for 18 hours, the temperature being maintained within the range of 104°–110° C. The resulting mixture was heated under vacuum to remove unreacted amine and alcohol. 25 parts of ammonium acid sulfate were added, the product being stirred and cooled during the addition. The salt mixture was then stirred and heated under 10–15 mm. pressure. 11.9 parts (46.8% yield) of N-n-butyl acrylamide were obtained.

Example 4

A mixture consisting of 107 parts of n-heptylamine and 34.4 parts of methyl acrylate was heated under reflux for 24 hours, the temperature being maintained within the range of 140°–150°

C. The resulting mixture was heated under vacuum to remove unreacted amine and alcohol. 20 parts of sulfuric acid (sp. gr. 1.84) were added, the product being stirred and cooled as the acid was added. The salt mixture was then stirred and heated under about 2 mm. pressure. 48.3 parts of crude N-n-heptyl acrylamide were obtained. After redistillation, the product had a boiling point of 118°–120° C./2 mm.

Example 5

150 parts of n-octylamine were gradually added to 43 parts of methyl acrylate during a period of about 15 minutes. The mixture was heated under reflux for 66 hours, the temperature being maintained within the range of 140°–145° C. The resulting mixture was heated under vacuum to remove unreacted amine and alcohol. 26.5 parts of sulfuric acid (sp. gr. 1.84) were added, the product being stirred and cooled during the addition. The salt mixture was then stirred and heated under about 3 mm. pressure. 78.9 parts of crude distillate were obtained. Redistillation gave a 58% yield of N-n-octyl acrylamide boiling at 119°–119.5° C./2–3 mm.

Example 6

73 parts of n-butylamine were gradually added to 40 parts of methyl methacrylate. The mixture was heated under reflux for 68 hours, the temperature being maintained at about 120° C. The resulting mixture was heated under vacuum to remove unreacted amine and alcohol. 20 parts of sulfuric acid (sp. gr. 1.84) were added, the product being stirred and cooled as the acid was added. The salt mixture was then stirred and heated under 2–3 mm. pressure. 53.2 parts of crude distillate were obtained which after redistillation gave a 60.2% yield of N-n-butyl methacrylamide.

Example 7

A mixture consisting of 463 parts of n-dodecylamine and 86 parts of methyl acrylate was heated under reflux at 140° C. for 96 hours. The resulting mixture was heated under vacuum at 150° C. to remove unreacted amine and alcohol. 75 parts of sulfuric acid (sp. gr. 1.84) were added, the product being stirred and cooled during the addition. One part of hydroquinone (antipolymerization agent) was added and the mixture was then heated under reduced pressure. 102 parts of crude N-n-dodecyl acrylamide were obtained as a distillate. Redistillation gave pure N-n-dodecyl acrylamide boiling at 150°–155° C./1 mm.

Example 8

101 parts of hydrochloric acid (sp. gr. 1.19) were added slowly to 200 parts of N-n-butyl-beta-n-butylaminopropionamide, the mixture being stirred and cooled during the addition. The water was distilled from the resulting mixture under reduced pressure. One part of hydroquinone was added and the mixture was then stirred and heated under 17 mm. pressure. 128 parts of distillate were obtained. Redistillation under 2 mm. pressure gave 107.8 parts of N-n-butyl acrylamide.

Example 9

52 parts of sulfuric acid (sp. gr. 1.84) were added slowly to 200 parts of N-n-butyl-beta-n-butylaminopropionamide, the mixture being stirred and cooled during the addition. One part of hydroquinone was added and the mixture was then stirred and heated under about 1 mm. pressure. 143.3 parts of distillate were obtained. Redistillation gave 116 parts of N-n-butyl acrylamide.

Example 10

115 parts of 85% phosphoric acid were added slowly to 200 parts of N-n-butyl-beta-n-butylaminopropionamide, the mixture being stirred and cooled during the addition. The water was distilled from the resulting mixture under reduced pressure. One part of hydroquinone was added and the mixture was then stirred and heated under about 1 mm. pressure. 108 parts of distillate were obtained. Redistillation under 1.5 mm. pressure gave 93.5 parts of N-n-butyl acrylamide.

Example 11

75 parts of hydrochloric acid (sp. gr. 1.19) were added slowly to 101 parts of N,N-dimethyl-β-dimethylaminopropionamide, the mixture being stirred and cooled during the addition. The water and unreacted hydrochloric acid were distilled from the resulting mixture under reduced pressure. One part of hydroquinone was added and the mixture was then stirred and heated under 15 mm. pressure. 54.6 parts of distillate were obtained. Redistillation under 32 mm. pressure gave 29.3 parts of N,N-dimethyl acrylamide boiling at 89°–91° C.

Example 12

100 parts of ethyl acrylate were added slowly to a mixture consisting of 95 parts of n-butylamine and 120.9 parts of n-butylamine hydrochloride heated under reflux. After adding the ethyl acrylate, heating under reflux was continued for 44 hours. The resulting mixture was heated under vacuum to remove unreacted amine and ethanol. One part of hydroquinone was added and the mixture was then stirred and heated under 17 mm. pressure. 122.5 parts of distillate were obtained. Redistillation under 1.5 mm. pressure gave 101.9 parts of N-n-butyl acrylamide.

The method herein described for the production of N-alkyl α,β-unsaturated amides is simple and easily operated. The desired amides are obtained in good yield and in substantially pure form. The residual alkyl amine may be recovered and recycled in the process.

The N-alkyl acrylamides prepared in accordance with the present invention are useful materials for polymerizations, and particularly for mixed polymerizations with other vinyl compounds and dienes to give unique properties to plastic products.

While the invention has been described with particular reference to specific embodiments, it is to be understood that it is not to be limited thereto but is to be construed broadly and restricted solely by the scope of the appended claims.

I claim:

1. A method of preparing an N-alkyl acrylamide which includes the steps of heating an N-alkyl-β-alkylaminopropionamide in the presence of an acidic material having a dissociation constant greater than $1.0 \times 10^{-2}$ and which forms a stable amine salt with a primary or secondary alkyl amine at elevated temperature to produce an N-alkyl acrylamide and an alkyl amine salt, and distilling the thus formed N-alkyl acrylamide from the alkyl amine salt.

2. A method of preparing an N-alkyl acrylamide of the formula:

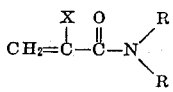

wherein X is a member of the group consisting of hydrogen and the methyl radical, one R represents an alkyl radical and the remaining R is chosen from the group consisting of hydrogen and an alkyl radical, which includes the steps of heating an N-alkyl-β-alkylaminopropionamide in the presence of an acidic material having a dissociation constant greater than $1.0 \times 10^{-2}$ and which forms a stable amine salt with a primary or secondary alkyl amine at elevated temperatures to produce an N-alkyl acrylamide and an alkyl amine salt, and distilling the thus formed N-alkyl acrylamide from the alkyl amine salt.

3. A method of preparing N-n-butyl acrylamide which includes the steps of heating N-n-butyl-β-n-butylaminopropionamide in the presence of ammonium acid sulfate to produce N-n-butyl acrylamide and n-butylamine sulfate, and distilling the thus formed N-n-butyl acrylamide from the n-butylamine sulfate.

4. A method of preparing N-n-dodecyl acrylamide which includes the steps of heating N-n-dodecyl-β-n-dodecylaminopropionamide in the presence of sulfuric acid to produce N-n-dodecyl acrylamide and n-dodecylamine sulfate, and distilling the thus formed N-n-dodecyl acrylamide from the n-dodecylamine sulfate.

5. A method of preparing N,N-dimethyl acrylamide which includes the steps of heating N,N-dimethyl-β-dimethylaminopropionamide in the presence of hydrochloric acid to produce N,N-dimethyl acrylamide and dimethylamine hydrochloride, and distilling the thus formed N,N-dimethyl acrylamide from the dimethylamine hydrochloride.

JOHN G. ERICKSON.

REFERENCES CITED

The following references are of record in the file of this patent:

UNITED STATES PATENTS

| Number | Name | Date |
| --- | --- | --- |
| 2,288,197 | Kranzlein et al. | June 30, 1942 |
| 2,295,655 | Hentrich et al. | Sept. 15, 1942 |
| 2,401,429 | Kung | June 4, 1946 |